Nov. 30, 1937.                A. HENDERSON                2,100,479
      APPARATUS AND METHOD OF MAKING EXPANDED CEMENT ARTICLES
                      Filed Oct. 23, 1934           2 Sheets-Sheet 1
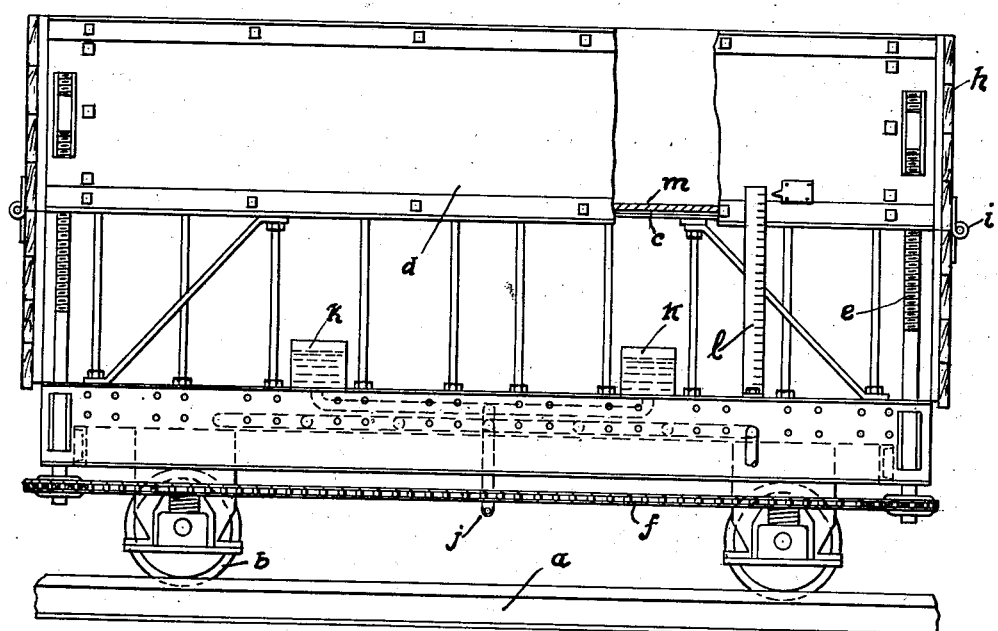
Fig. 1.
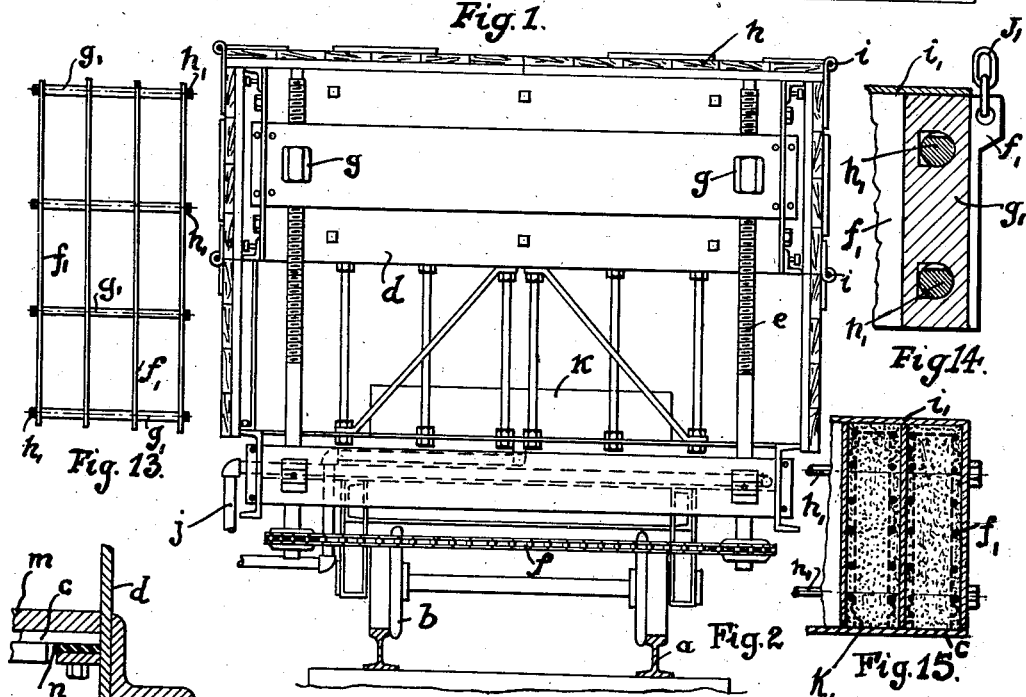
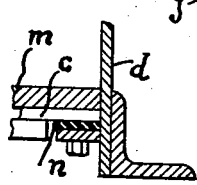
Fig. 3.
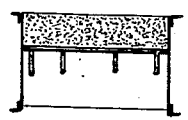
Fig. 16.
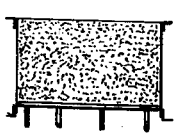
Fig. 17.
INVENTOR

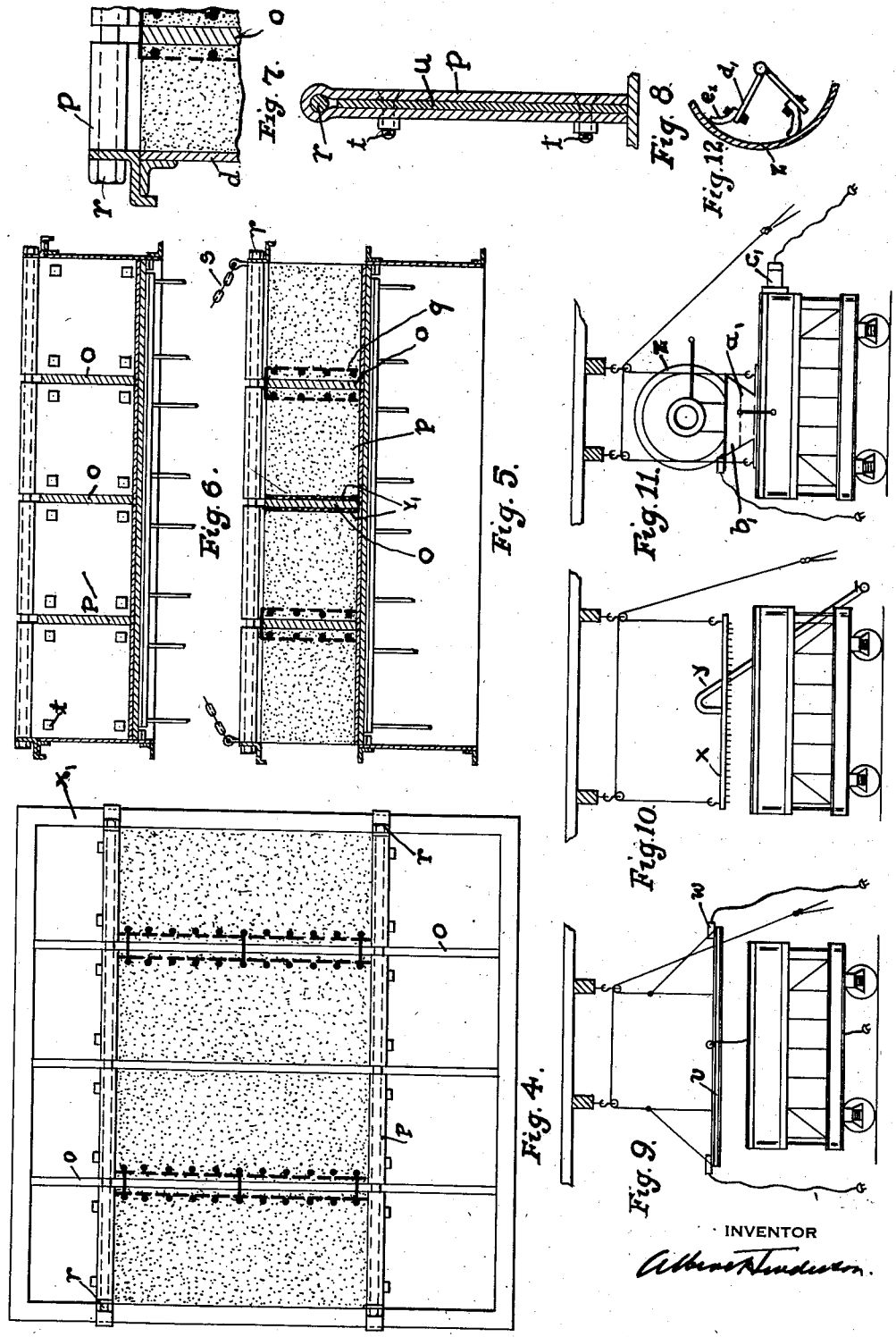

Patented Nov. 30, 1937

2,100,479

UNITED STATES PATENT OFFICE 2,100,479

APPARATUS AND METHOD OF MAKING EXPANDED CEMENT ARTICLES

Albert Henderson, Pittsburgh, Pa., assignor to William P. Witherow, Pittsburgh, Pa.

Application October 23, 1934, Serial No. 749,593

10 Claims. (Cl. 25—121)

This invention relating to apparatus and method for making expanded cement articles is a continuation in part of my co-pending application Serial No. 540,856, filed May 29, 1931, Method of making structural units.

The object of this invention is to provide an improved method for making not only expanded cement articles, but also concrete articles. It further contemplates breaking down the lumps of cement in the mixer, also screening the cement mix as it is being poured. Lumps in expanded or cellular cement articles cause cracks in the articles and make sawing of the article more difficult.

This invention also contemplates depositing in a vessel a cementitious mix that expands and introducing into the mix a form having spaced dividing walls having a plate, and a top cover wall so that the mix will expand between the plates and on striking the top plate will level off and give the top of the article a smooth finish. The benefit of this top cover wall is the elimination of the present practice of sawing the tops of the articles. It also gives a better cellular structure as sufficient mix is put in the vessel to allow for slightly more expansion than the height of the form walls. I also contemplate introducing simultaneously with form walls the reinforcing means and again I may introduce with these form walls a surface material simultaneously with the introduction of these form walls.

After the mix has expanded between the form walls and the cover wall plate, I may, when the mix is sufficiently hard to be self-supporting, remove all contents of the vessel in one operation or I may remove the form and leave the articles resting on the bottom of the vessel either for further hardening or if sufficiently hardened remove the articles individually to the stock pile.

Another object of this invention is to provide a portable combination curing chamber and a machine positioned therein for making cementitious articles so that the present expensive and wasteful method of separate curing chambers is avoided. These forms may be placed on a flat surface and concrete poured therein from the top. Then when the product is hardened the articles therein may be removed with the forms or the forms may be removed leaving the articles where cast to be removed later. Also in the art of making expanded cement articles, it is vitally important to not only heat the article until it hardens, but also to heat the walls of the vessel and the dividing plates. The metallic agent required to form the cellular or expanded cement generates considerable heat in giving off the gas. Should this gas cool off, the article has a tendency to slump slightly and crack the fragile cell walls; therefore, it is vitally important to keep heat around the expanded mass, until the cell walls are sufficiently hard to prevent this slumping. Cold walls absorb heat from the mix and would permit a much higher expansion in the middle of the article than there would be on the sides. Furthermore, if the walls are not heated, heat is robbed from the mix and the gas forming the cells near the walls contracts due to the loss of temperature. Cellular cement takes several hours to harden; therefore, it is important to keep this temperature around the mix several hours. The cell walls are very fragile during this period and are easily cracked. Furthermore, cellular cement products shrink when setting and as this hardening time is controlled by temperature, without heat the mix would set up in the middle of the mass more quickly than the mass would set up around the sides. This shrinkage due to the hardening up process would take place unevenly causing internal stresses within the mass resulting in cracks. By keeping heat around this mass, we prevent uneven shrinkage. Another cause of cracking in cellular cement is in the drying-out of the article during the hardening period. The drying-out takes place quickly on the surface and as the drying-out process involves shrinkage, we would also have shrinkage cracks around the sides of the article. To overcome this, I provide means for keeping the air around the articles moist during the hardening period. Due to the fragile nature of cellular cement, we cannot use metal that rusts as the surface of the articles is easily torn. Therefore, I use rustless metal, such as stainless steel or galvanized metal.

I also provide an improved form arrangement of plates having spacers therebetween. Through these plates and spacers, I introduce rods, which clamp them together. These rods are round and have a head and nut. One portion of these rods is flat and the holes in the spacers are square on one side so that when the nuts of the rods are loosened and the rod is given a quarter turn, the plates are loosened and the spacers can move sideways, thereby releasing the articles freely when the plates are elevated, leaving the articles either on the bottom of the vessel or on the storage pile.

In the accompanying drawings illustrating the present preferred embodiment of my invention, Figure 1 is a side view of the portable combination mold or vessel and a curing chamber; Figure 2 is an end view of the same; Figure 3 is a sectional detail of the bottom plate with respect to the side of the vessel; Figure 4 is a plan view of a modified form having dividing plates; Figures 5 and 6 are sections of this modified form; Figure 7 is a detail of this modified form; Figure 8 is a section of a spacer of this modified form; Figure 9 shows the combination mold and curing chamber beneath a vibrating frame; Figure 10 is the portable combination mold and curing chamber under an oil spraying device; Figure 11 is the portable combination mold and curing chamber being filled by a mixer through a hopper; Figure 12 is a sectional detail of improved mixer; Figure 13 is a plan view of improved plates and spacer for a form; Figure 14 is a section through the spacer showing dividing plates and top plates for this improved form; Figure 15 is a section of the form showing expanded reinforced articles therein and Figures 16 and 17 are sections showing a method of gauging the amount of mix required to fill the vessel after expansion.

Figures 1 and 2 illustrate the general arrangement of my improved combination apparatus for making cement articles having a curing chamber surrounding the molding apparatus. The apparatus rests on rails $a$ and has wheels $b$. The bottom plate $c$ is fixed and side plates $d$ are raised and lowered by screws $e$, acting simultaneously by chain $f$, the screws coacting with nuts $g$. Bottom plate $c$ and side plate $d$ form the vessel or mold. This vessel is surrounded by enclosure $h$, which has convenient hinges $i$ so that the enclosure may be opened. This enclosure forms a curing chamber which is heated through the pipes $j$. Also humidity of the curing chamber is controlled by vessels $k$ which contain water. Measuring means $l$ is a convenient arrangement for regulating the side plates $d$ with respect to the bottom plates $c$.

The manufacturing operation involved is as follows: I deposit in the mold or vessel a predetermined amount of a mix that expands shortly after it is mixed. This amount can be determined by lowering the side plates to a predetermined position then filling the vessel to the top of sides $d$ with the mix. I then raise the side plates to the full height of the article to be made and permit the mix to expand and fill the increased volume of the mold. The dividing plates comprising the form may be introduced after the mix has expanded, but I prefer to introduce the plates before the mix expands. The portable apparatus is then moved out of the way and the articles therein are allowed to harden. Then the vessel walls are released after which the plates and articles may be removed from the vessel simultaneously. The plates may be removed and the articles allowed to rest on the bottom of the vessel after which they may be further cured or may be placed in the stock pile immediately after being released.

Figure 3 is a detail of bottom wall plate $c$ and side wall plate $d$ with a soft material $m$ on top of plate $c$. This permits the plates to overcome any unevenness on the metal plate $c$. Rubber strip $n$ is bolted to plate $c$ to prevent leakage of the mix from around the sides $d$.

Figure 4 shows a vessel $x_1$ with side plates $o$ and spacer plates $p$ showing how articles may be made in a shorter length than the vessel. Spaced plates $p$ may be introduced into the vessel at the ends of plates $o$. After the introduction of the mix into the mold, plates $p$ may be pushed over to any position desired or concrete may be poured in the form as shown and removed en masse, that is, the spaced plates may be introduced into the vessel, thereby subdividing it, then filled with concrete.

Figure 5 is a section showing spacer plates $o$ with surface material $y_1$ secured thereto. Also it shows spacer plates $o$ with the reinforcing $q$ secured thereto. These plates are clamped together by bolts $r$. Chain $s$ is secured to the plates to permit their removal from the vessel.

Figure 6 shows plates $o$, end plates $p$ and bolts $t$ secured through end plate $p$.

Figure 7 is a detail of side wall $d$ of the mold, dividing plate $o$, bolt $r$, and end plate $p$.

Figure 8 is a detail of end plate $p$ with rubber core $u$ and bolts $t$ and $r$. When bolts $t$ are tightened up, rubber $u$ presses against the side plates $o$ thereby preventing leakage.

Figure 9 shows the portable apparatus under a vibrating frame. The vibrating frame $v$ is lowered onto the top of apparatus when required. Vibrator frame $v$ is vibrated by mechanical vibrator. This apparatus will hook onto the plates after the product is cured so that the removal from the plates of the product will be facilitated by this vibration. This frame may hook to links $j$ in Figure 14.

Figure 10 is a frame $x$ having spray outlets for either water or oil supplied by the pipe $y$. The oil is for spraying the sides of the vessel and the water is to thoroughly soak the products before their removal to the stock pile.

Figure 11 shows mixer $z$ depositing a mix into the apparatus. This mix after it leaves the mixer and before it enters into the vessel is freed from lumps by screen $a_1$ positioned in hopper $b_1$. A vibrator $c_1$ assists in thoroughly levelling off the mix when it is poured into the vessel. This mix is watery and it is imperative that it be perfectly level so that there is a uniform height of expansion on all sides.

Figure 12 is a section of mixer $z$ wherein the paddles $d_1$ have a means $e_1$ of breaking down the lumps of cement. In the process of making expanded cement, I add to cement a metallic powder. This is mixed for several minutes, then water is added. The tendency is for this cement to form small lumps which must be reduced to a liquid. Should these lumps get in the article they cause trouble by cracking and when the saw strikes these lumps, it is damaged. Reducing means $e_1$ can be of spring sheet steel which flattens the lumps against the side of the mixer. I may have in the mixer other ordinary paddles with this means $e_1$ attached thereon.

Figure 13 shows a form comprising spaced plates $f_1$ and spacers $g_1$ clamped together by bolts $h_1$. Plates $f_1$ may be of stainless steel or galvanized metal. The spacers may be made of long leaf yellow pine wood.

Figure 14 is a detail of Figure 13 dividing plate $f_1$ having the top plate $i_1$ and spacer $g_1$ showing bolt $h_1$. Spacers $g_1$ have round holes through them with one side square as shown and bolts $h_1$ have one part planed off plate as shown so that when bolts $h_1$ are loosened and turned a quarter turn not only are plates $f_1$ loosened, but spacers $g_1$ are also loosened sideways thereby facilitating without damage the removal of the articles therein. Top plate $i_1$ may be removable. These plates when assembled can be entirely immersed in a tank of oil or soapy water before their use, thereby reducing the cost of oiling the individual subdivisions of the form. To the ends of plates $f_1$ I attach links $j_1$ so that when the bolts $h_1$ are loosened, there is no binding action between the plates and the spacers as they are suspended. All these plates will have individual links at each end, which may be secured to a vibrated hoisting means so that the articles are not fouled within the form. Top plate $i$ saves the cutting off of the tops of the articles and as the tendency for expanded cement is to be higher in the middle than the sides, the plate will flatten out the material when it rises during expansion period. This will also result in a better cellular structure due to a certain amount of pressure brought about by providing an expansion slightly higher than the sides of the article which means the top plate will exert pressure on the expanded mix. I may, when casting some of these articles, tilt the apparatus or molds so that the material will expand along the top, sides and the bottom. When the mold is tilted, air can escape at the elevated top end of the mold. Furthermore, the tendency, in making reinforced expanded cement articles, is for holes to appear at the top part of the article due to the reinforcing means breaking up the cell structures. I have found that these plates on the top exert pressure and overcome this difficulty. Also by elevating one end of the mold for reinforced articles, I get a much better product. For instance, in making $2'' \times 12'' \times 10'0''$ long reinforced expanded cement plank, if the forms are elevated at one end 6'', then the top plate becomes a part of the mold and the expansion travels along the form rather than straight up.

Figure 15 is detail of Figure 13 and shows bolts $h_1$ bottom plate $c$, top plate $i_1$, side plates $f_1$ with reinforcing $k_1$. I take this reinforcing, which is a welded metal fabric, comprising wires welded probably on 2'' centers to cross wires. As this fabric comes off the roll I bend it in the middle area leaving enough material at the middle to snugly fit in between the plates with room, however, for covering the wires with sufficient expanded cement. The ends of the fabric would be probably a foot apart. This fabric is shoved between the plates $f_1$ and acts like a spring, the pressure being sufficient to hold the fabric between the plates.

Figure 16 shows the vessel with the bottom plate $c$ side plates $d$ forming a measure for a predetermined quantity of a mix that expands.

Figure 17 shows bottom plate $c$ and side plate $d$ forming the enlarged vessel in Figure 16, which is completely filled from the predetermined amount deposited in the vessel before expansion, that is, this vessel can be arranged so that it forms a measure so that when this mold is enlarged to the height of the article desired, the measured amount of the mix before expansion should accurately fill the enlarged mold without losing material after its expansion.

I may take an ordinary flat car and put on the car four channels forming side walls. These channels would form a box-like structure bolted at the corners and may be secured to the flat car. Grease between the bottom of these channels and the top of the flat car would prevent leakage of the mix that expands. Then I can introduce into this box-like structure plates as Figure 13 and having a top plate. Then the car could be put into a separate hardening chamber and after sufficient hardening, the car would be pushed to the stock pile. The four channels forming the box-like structure on the car could be loosened up without being removed, the contents within the box-like structure could then be elevated out either en masse or the plates could be removed and the articles themselves separately removed to the stock pile from the car.

I may deposit into the vessel the exact amount of the mix that expands without using the apparatus as a measuring means, then vibrate the mix to make it level all over so that a uniform rise is obtained, then I introduce into the vessel dividing plates. A surface material for the articles, such as paper, metal, etc., may be attached to the plates so that the plates and surface material are introduced into the mix at the same time. I also may introduce a reinforcing means at the same time with the dividing plates and surface material. Subdividing the mass while it is plastic reduces the chances of shrinkage cracks as the smaller the article, the less possibilities of internal stresses due to the natural shrinkage of the material.

The surface material as shown on Figure 5, $y_1$ may be fastened to the plates and the material will expand up and against the surface material bonding thereto.

Casting this mix that expands in a number of small moulds is expensive as the exact amount of the mix required in each mould is difficult to gauge and the labor involved in this method is costly. If the mix is cast in a large mass and sub-divided when the mix sets up after expansion, there is much loss of the material due to internal cracks caused by the natural shrinkage of such a mass. Therefore I prefer to subdivide the material while it is in a plastic state, thereby reducing the liability of shrinkage cracks due to the smaller volume of the material.

The form wall plates $f_1$, Fig. 13, are vibrated loose from the articles when they are hardened, but I may have a mechanical means for separating these wall plates from the articles such as a wedging or screw device. Provision is made for the escape of air within the form when the mix expands therein. The wall plates are heated in the curing chamber of Fig. 1, or they may be heated elsewhere.

The articles made by this method are used for building purposes, also insulating purposes such as partitions, backups, fireproofing roofs, floors, ceilings, brick, shingles, etc.

Reinforced expanded cement block such as $2' \times 12'' \times 10$ feet long may be made on the form shown in Fig. 13. Also by tapering the spacer walls $g_1$, and bringing the side wall plates $f_1$ close together, concrete tapered shingles can be made with the large end at the bottom of the form and, holes formed in the plates $f_1$ for wire which can be pulled out when the shingles are partially set, providing nail holes in the shingles.

The apparatus and method of manufacture described here are equally useful for solid concrete as well as cellular or expanded concrete. Instead of steam pipes as shown in Fig. 1 for heating the hardening chamber, I may use an oil stove to generate the heat required, thereby making the entire apparatus self-contained.

The welded metal fabric which is used for reinforcing has crimps on the vertical cross wires to keep the reinforcing away from the face of the form walls and as described in Fig. 15 is sprung into place by having the open end wider than the width of the article.

I claim as my invention:

1. In a method of making expanded cement articles the steps consisting in reducing the volume of a vessel to form a measure filling said vessel with a mix that expands, enlarging the volume of the vessel and permitting the mix to expand and substantially fill said enlarged vessel.

2. In a method of making expanded cement articles, the steps consisting in filling a mold to a predetermined level with a mix that expands, whereby to measure the mix, enlarging the volume of the mold, and permitting the said mix to expand and fill the enlarged mold.

3. Apparatus for making expanded cement articles comprising a watertight vessel, dimensioned to receive and measure an amount of an expanding mix, means for changing the volume of said vessel to provide for expansion of the mix, and a removable bottomless gang mold positioned in said vessel for dividing the mix and providing separate compartments into which divided portions of the mix may expand.

4. In a method of making expanded cement articles, the steps consisting in filling a container with a mix that expands to measure the mix, expanding the container, inserting partitions within the container, and allowing the mix to expand between the partitions.

5. In a method of making expanded cement articles, the steps including pouring a cementitious mix capable of expansion into a mold, and subdividing the mix while in the mold, after expansion thereof has commenced and before expansion thereof is completed.

6. The method defined by claim 5 characterized by placing reinforcement for said articles in said mix before complete expansion thereof, whereby the reinforcement is completely surrounded on completion of the expansion.

7. The method defined by claim 5 characterized by positoning surface material for said articles in said mix before complete expansion thereof.

8. In a method of making expanded cement articles, the steps including depositing in a trough a cement mix having a gas generating agent therein, and simultaneously forming a plurality of articles from said mix within said trough during the period in which said agent generates gas.

9. The method defined by claim 8 characterized by placing reinforcement for said articles in said mix before complete expansion thereof, whereby the reinforcement is completely surrounded on completion of the expansion.

10. The method defined by claim 8 characterized by positioning surface material for said articles in said mix before complete expansion thereof.

ALBERT HENDERSON.